May 20, 1930. O. PETERSEN 1,759,367
INJECTION VALVE FOR INTERNAL COMBUSTION ENGINES
Filed Oct. 20, 1927
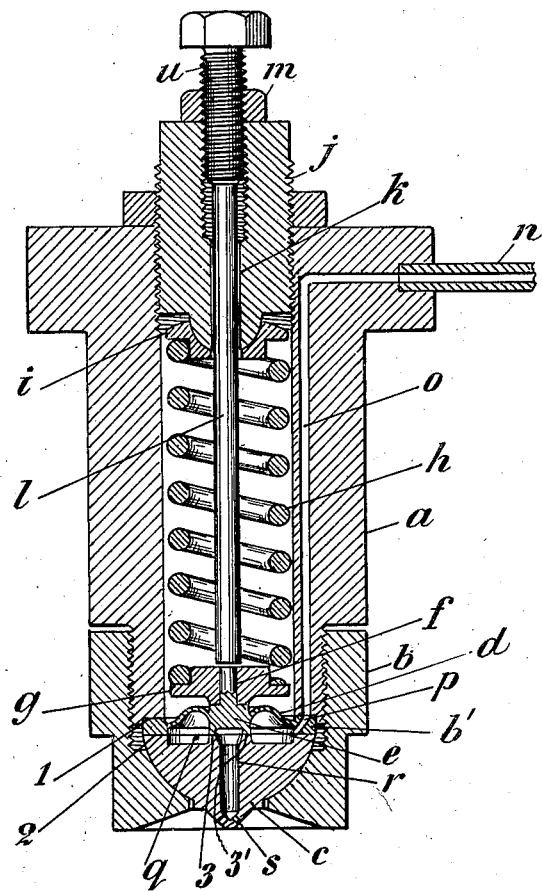
O. Petersen INVENTOR
By: Marks & Clerk ATTYS.

Patented May 20, 1930

1,759,367

UNITED STATES PATENT OFFICE

OVE PETERSEN, OF HELLERUP, NEAR COPENHAGEN, DENMARK

INJECTION VALVE FOR INTERNAL-COMBUSTION ENGINES

Application filed October 20, 1927, Serial No. 227,546, and in Denmark August 31, 1927.

This invention relates to an injection valve for internal combustion engines of the kind in which the fuel is injected directly by means of pump pressure without compressed air being used, the fuel oil being forced through a pipe or channel to the fuel valve by means of a fuel pump governed by the engine and the oil then exerting action on a device within the fuel valve, so that the said valve is opened and permits injection of the fuel into the engine cylinder.

According to the invention, the valve spindle is omitted altogether and replaced by a diaphragm clamped between polished surfaces at the lower end of the fuel valve housing and forming the upper boundary of a hollow space into which the fuel oil is admitted through drilled passages of which there may be a suitable number and which partly serve also for allowing air which possibly might be in the hollow space to escape. This diaphragm is capable of yielding to the pressure of the fuel oil, thereby either causing the valve to be opened or making room for this opening movement of the valve. Or the diaphragm may cooperate with the unit serving to close the valve, the said unit following the movements of the diaphragm, either completely or to some extent, in such a manner that the valve opens when the diaphragm yields to the pressure of the fuel oil, and closes when the diaphragm again occupies its normal position.

The diaphragm may consist of a single plate, either flat or with annular corrugations (alternate ridges and grooves), and the edge of the diaphragm, normally somewhat heavier, may be provided with polished faces seating on corresponding surfaces in the valve housing. At its centre the diaphragm may have a raised (heavier) portion in which is provided a valve seat bearing tight against a corresponding valve seat on the injecting nozzle when the valve is closed. The valve seat may be flat, conical or spherical and may have at its centre a depression, formed by turning or drilling, so as to give it an annular shape. When the valve is closed the valve seat of the diaphragm, in order to obtain tightness, must remain forced against the valve seat of the injecting nozzle with a certain pressure, which may be done either by providing the diaphragm with a certain initial tension or by means of a spring device acting on the diaphragm.

The figure represents a vertical sectional view through the device.

In the drawing the reference character $a$ indicates the valve housing which is closed at its lower end by a diaphragm $d$ whose raised edge $b^1$, polished on both sides into true flats, is clamped between the end face 1 of the valve housing and the edge 2 of the injecting nozzle $c$, both of which surfaces are polished into true flats, so that the edge of the diaphragm fits oil-tight between the end face 1 of the housing and the edge 2 of the injecting nozzle. At its centre the diaphragm $d$ has a projection or raised portion $e$, the bottom face of which is formed into a flat, annular valve seat 3 corresponding to another flat seat 3' provided on the injecting nozzle $c$.

The central raised portion of the diaphragm $e$ is extended upwards into a pin or the like $f$ serving as guide for the spring seat $g$ on which seats a spiral spring $h$ above seating against another spring seat $i$ provided with a spherical surface adapted to receive another spherical surface on a thrust screw $j$ screwed into the valve housing $a$, the said screw $j$ serving to put the spring under tension. Through a central bore $k$ in the thrust screw $j$ a stop $l$ is introduced, this stop being made in one with a screw $u$ which is screwed into the upper threaded portion of the said bore $k$ and serves to adjust the stop in relation to the thrust screw; the stop may be secured in any desired position by means of a lock-nut $m$. The stop or stop rod $l$ serves to restrict the lift of the valve formed by the raised central portion $e$ of the diaphragm, the stop being so adjusted that there is only a slight amount of play between the lower end face of the stop and upward faces of the projection $f$ and the spring seat $g$. The fuel oil is conveyed through the pressure pipe $n$ and the drilled passages or channels $o$ and $p$ into an annular hollow space $q$ between the upper face of the injecting nozzle $c$ and the diaphragm.

When the pressure in the pressure piping $n$ increases because of the action of the pump pressure and the pressure in the hollow space $q$ becomes sufficiently high to overcome the tension of the spring $h$, the diaphragm will yield, its central portion $e$ being raised to the extent allowed or determined by the tension of the compressed spring or by the stop $l$, and accordingly the valve opens, so that the oil is forced, into the combustion space of the engine through the central aperture $r$ and atomizing openings $s$ in the injecting nozzle. When the pressure in the hollow space $q$ sinks below a certain value the spring $h$ will again force the central portion of the diaphragm downwards, thereby closing the valve.

The lower surface of the injecting nozzle $c$ is spherical and engages a corresponding spherical surface in the ring nut $b$, and accordingly the injecting nozzle may adjust itself freely to the flat edge of the diaphragm when the valve is screwed together. Thus the clamping pressure will be uniformly distributed over the whole area of the said edge or rim, so that complete tightness between the adjacent surfaces is obtained and simultaneously the diaphragm is secured in its proper position in relation to the valve housing and the injecting nozzle.

The constructional details of the invention may, of course, be varied in many different ways. Thus the diaphragm may be clamped in position in the valve housing by means of the injecting nozzle itself, by a lining screwed into the housing or in a similar way.

The closing unit or active area or surface of the valve need not be connected directly with the diaphragm. The arrangement may just as well be such that the diaphragm cooperates with a valve or a closing unit or surface following the motion of the diaphragm either completely or in part, so that the valve opens when the diaphragm yields to the pressure of the fuel oil. The motion of the diaphragm need not take place in a direction away from the valve seat and may have any other desired direction, if only the valve is built so as to correspond with the direction of motion.

I claim:

1. An injection valve for internal combustion engines comprising a valve casing, a metal diaphragm having a solid central part, a flexible intermediate part and an inflexible rim having smooth flat surfaces, said central part on its under side having a flat annular valve seat surrounding a recess, and a flat upper surface, a semi-spherical injection nozzle having an outer rim with flat surfaces corresponding to the rim of the diaphragm, and a raised central part having a flat valve surface, said rim and said central part forming an annular channel in said nozzle, a ring nut having an inner spherical surface corresponding to the outer spherical surface of said injection nozzle, said ring nut being adapted to cooperate with said casing for securing said diaphragm between said nozzle and said casing, the flat surface of said rim forming an oil-tight joint, said annular valve surface of the central part of said diaphragm being adapted to register with the flat valve surface of the central part of said nozzle and normally form an oil-tight valve, said nozzle having atomizing apertures therein and a central aperture communicating the recess of said central part of the diaphragm with the atomizing apertures, the expansible-contractible chamber formed by said diaphragm and the annular channel in said nozzle communicating with oil conduit means in said casing, spring means disposed in the flat upper surface of the central part of said diaphragm for normally maintaining the valve in its closed position, means for adjusting said spring means, and an adjustable stop adapted to restrict the lift of the valve of said diaphragm.

2. In an injection valve for internal combustion engines comprising a valve casing, a metal diaphragm having a solid central part, a corrugated flexible intermediate part and an inflexible rim having smooth flat surfaces, said central part on its under side having a flat annular valve seat surrounding a recess and a flat upper surface, a semi-spherical injection nozzle having an outer rim with flat surfaces corresponding to the rim of the diaphragm and a raised central part having a flat valve surface, said rim and said central part forming an annular channel in said nozzle, said valve casing having an annular flat surface corresponding with the flat surface of the rim of said diaphragm, a ring nut having an inner spherical surface corresponding to the outer spherical surface of said injection nozzle, said ring nut being adapted to cooperate with the casing for securing said diaphragm between said nozzle and said casing, the flat surfaces of said rim forming an oil-tight joint, said annular valve seat of the central part of said diaphragm being adapted to register with the flat valve surface of the central part of said nozzle and normally form an oil-tight valve, said nozzle having atomizing apertures therein and a central aperture communicating the recess of said central part of the diaphragm with the atomizing apertures, said corrugated flexible intermediate part of said diaphragm being adapted to register with the annular channel in said nozzle to form an expansible contractible chamber, said expansible contractible chamber communicating with oil conduit means in said casing, spring means disposed on the flat upper surface of the central part of said diaphragm for normally maintaining the valve in its closed position, means for adjusting said spring means, and a stop adapted to restrict the lift of the valve of said diaphragm.

3. Injection valve as claimed in claim 1 in which the diaphragm is provided with a raised peripheral edge which with plane faces bears closely against the valve house and the injection nozzle respectively.

4. An injection valve for internal combustion engines comprising a valve casing, a metal diaphragm having a solid central part, a flexible intermediate part and an inflexible rim having smooth flat surfaces, said central part on its under side having a flat annular valve seat surrounding a recess, and a flat upper surface, a semi-spherical injection nozzle having an outer rim with flat surfaces corresponding to the rim of the diaphragm, and a raised central part having a flat valve surface, said rim and said central part forming an annular channel in said nozzle, a ring nut having an inner sperical surface corresponding to the outer spherical surface of said injection nozzle, said ring nut being adapted to cooperate with said casing for securing said diaphragm between said nozzle and said casing, the flat surface of said rim forming an oil-tight joint, said annular valve surface of the central part of said diaphragm being adapted to register with the flat valve surface of the central part of said nozzle and normally form an oil-tight valve, said nozzle having atomizing apertures therein and a central aperture communicating the recess of said central part of the diaphragm with the atomizing apertures, the expansible-contractible chamber formed by said diaphragm and the annular channel in said nozzle having a plurality of passages communicating with oil conduit means in said casing, spring means disposed on the flat upper surface of the central part of said diaphragm for normally maintaining the valve in its closed position, means for adjusting said spring means, and an adjustable stop adapted to restrict the lift of the valve of said diaphragm.

In testimony whereof I affix my signature.

OVE PETERSEN.